(12) United States Patent
Mani et al.

(10) Patent No.: US 9,736,077 B2
(45) Date of Patent: Aug. 15, 2017

(54) ENHANCED MEDIA QUALITY MANAGEMENT

(71) Applicant: Imagination Technologies Limited, Kings Langley (GB)

(72) Inventors: Senthil Kumar Mani, Hyderabad (IN); Bala Manikya Prasad Puram, Hyderabad (IN); Sowmya Mannava, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 120 days.

(21) Appl. No.: 14/677,791

(22) Filed: Apr. 2, 2015

(65) Prior Publication Data

US 2015/0288607 A1 Oct. 8, 2015

(30) Foreign Application Priority Data

Apr. 2, 2014 (GB) .................................. 1405948.9

(51) Int. Cl.
*G01R 31/08* (2006.01)
*H04L 12/825* (2013.01)
(Continued)

(52) U.S. Cl.
CPC ............ *H04L 47/25* (2013.01); *H04L 1/0015* (2013.01); *H04L 65/1083* (2013.01);
(Continued)

(58) Field of Classification Search
CPC ... H04L 47/25; H04L 65/1083; H04L 1/0015; H04L 65/80; H04L 1/0009; H04L 1/0007;
(Continued)

(56) References Cited

U.S. PATENT DOCUMENTS 6,714,551 B1 3/2004 Le-Ngoc
7,017,102 B1 3/2006 Kristensson et al.
(Continued)

FOREIGN PATENT DOCUMENTS

GB 2392582 A 3/2004
WO 0139423 A2 5/2001

OTHER PUBLICATIONS

Khalifeh et al. "A Hybrid Media Transmission Scheme for Wireless VoIP", Data Compression Conference, Utah, U.S, Mar. 24-26, 2010.
(Continued)

*Primary Examiner* — Robert Wilson
(74) *Attorney, Agent, or Firm* — Vorys, Sater, Seymour and Pease LLP; Vincent M DeLuca

(57) ABSTRACT

A device for transmitting a media stream over a network, the device comprising: a quality estimator configured to maintain a measure of network quality indicative of available bandwidth over the network; a configuration manager configured to: use the measure of network quality to detect a reduction in network quality indicative of a reduced available bandwidth and, responsive to detecting said reduction, estimate a first bitrate corresponding to the reduced available bandwidth; in response to estimating the first bitrate, determine a second bitrate lower than the first bitrate; and a transceiver configured to transmit the media stream at a transmission bitrate substantially equal to the second bitrate for a first period of time, wherein the configuration manager is further configured to cause an increase of the transmission bitrate from the second bitrate to the first bitrate over a second period of time.

22 Claims, 6 Drawing Sheets

(51) Int. Cl.
*H04L 29/06* (2006.01)
*H04M 7/00* (2006.01)
*H04W 28/02* (2009.01)
*H04L 1/00* (2006.01)

(52) U.S. Cl.
CPC ............ *H04L 65/602* (2013.01); *H04L 65/80* (2013.01); *H04M 7/0072* (2013.01); *H04W 28/0236* (2013.01); *H04L 1/0002* (2013.01); *H04L 1/0007* (2013.01); *H04L 1/0009* (2013.01)

(58) Field of Classification Search
CPC .............. H04L 1/0002; H04M 7/0072; H04W 28/0236
See application file for complete search history.

(56) References Cited

U.S. PATENT DOCUMENTS

| | | | |
|---|---|---|---|
| 7,581,155 | B2 | 8/2009 | Lee et al. |
| 2004/0153951 | A1 | 8/2004 | Walker et al. |
| 2005/0201414 | A1 | 9/2005 | Awais |
| 2007/0076754 | A1 | 4/2007 | Krishnaswamy |
| 2008/0133744 | A1 | 6/2008 | Ahn et al. |
| 2010/0128604 | A1* | 5/2010 | Appleby .......... H04N 21/23106 370/230 |
| 2013/0332620 | A1* | 12/2013 | Gahm .............. H04N 21/23805 709/231 |
| 2014/0019593 | A1* | 1/2014 | Reznik .................. H04L 65/60 709/219 |
| 2014/0201382 | A1* | 7/2014 | Shivadas ............... H04L 65/605 709/231 |
| 2015/0095450 | A1* | 4/2015 | Vitthaladevuni ....... H04L 47/25 709/217 |
| 2015/0288607 | A1* | 10/2015 | Mani ..................... H04L 1/0015 370/230 |

OTHER PUBLICATIONS

Padhye et al. "A New Adaptive FEC Loss Control Algorithm for Voice Over IP Applications", IEEE International Performance, Computing and Communication Conference, 2000 pp. 1-7.
Refaey et al. "A New Approach for FEC Decoding Based on the BP Algorithm in LTE and WiMAX Systems", Information Theory (CWIT)12th Canadian Workshop, May 17-20, 2011, pp. 9-14.
Filho et al. "Adaptive forward error correction for interactive streaming over the Internet", IEEE Global Telecommunications Conference,2006, pp. 1-6.
Ahmad et al. "An Improved FEC Scheme for Mobile Wireless Communication at Vehicular Speeds" Telecommunication Networks and Applications Conference, Adelaide, SA, Dec. 2008, pp. 312-316.
Shankar "Error Correcting Codes", Resonance vol. 2, Issue 1, Jan. 1997, pp. 34-43, Mar. 1997 pp. 33-45.
Rosenberg et al. "An RTP Payload Format for Generic Forward Error Correction", RFC 2733,Dec. 1998, pp. 1-26.
Watson et al. "Forward Error Correction (FEC) Building Block", RFC 5052,Aug. 2007, pp. 1-25.
A, Li, Ed. "RTP Payload Format for Generic Forward Error Correction", RFC 5109, Dec. 2007, pp. 1-44.
Roca et al. "Low Density Parity Check (LDPC) Staircase and Triangle Forward Error Correction (FEC) Schemes", RFC 5170, Jun. 2008, pp. 1-33.
Lacan et al. "Reed-Solomon Forward Error Correction (FEC) Schemes", RFC 5510, Apr. 2009, pp. 1-28.
RFC 3611, "RTP Control Protocol Extended Reports (RTCP XR)", 2003, pp. 1-55.

* cited by examiner

ENHANCED MEDIA QUALITY MANAGEMENT

BACKGROUND OF THE INVENTION

This invention relates to methods and systems for managing the transmission of a media stream in changeable network conditions.

Real-time streaming of media content over the internet has become an increasingly common application in recent years. A wide range of media applications, such as Voice over Internet Protocol (VoIP), on-demand TV, live TV viewing, video conferencing, net meetings, video telephony and many others rely on end-to-end streaming solutions. Unlike a "downloaded" media file, which may be retrieved first and played back later, streaming media applications require a media source to encode and to transmit media over a network to a receiver, which must decode and play the media in real time.

Problems can arise when a media stream is transmitted across a network due to the changing network conditions typically experienced by the stream. For example, a drop in the bandwidth available to a media stream due to network congestion or due to the limited throughput capacity of 2G/3G networks can adversely affect the timely transmission of the packets of the stream and lead to packet loss or late delivery of data packets of the stream. For a media stream between VoIP end points, such issues can affect the quality and reliability of VoIP calls. On the other hand, whenever bandwidth availability is high, highest voice quality can be provided to the end user for best end user experience.

There is a need for a method of managing and adapting the transmission of media over networks having changeable properties so as to optimise, or improve, the quality of a media stream received at a receiving device.

SUMMARY

According to a first aspect there is provided a device for transmitting a media stream over a network, the device comprising: a quality estimator configured to maintain a measure of network quality indicative of available bandwidth over the network; a configuration manager configured to: use the measure of network quality to detect a reduction in network quality indicative of a reduced available bandwidth and, responsive to detecting said reduction, estimate a first bitrate corresponding to the reduced available bandwidth; in response to estimating the first bitrate, determine a second bitrate lower than the first bitrate; and a transceiver configured to transmit the media stream at a transmission bitrate substantially equal to the second bitrate for a first period of time, wherein the configuration manager is further configured to cause an increase of the transmission bitrate from the second bitrate to the first bitrate over a second period of time.

The second bitrate may be determined in dependence on the measure of the reduced network quality.

The first and second bitrates may be determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

The configuration manager may be configured to estimate the first bitrate by selecting a first transmission configuration from the plurality of predefined transmission configurations corresponding to the greatest bitrate that is less than the reduced available bandwidth, the first transmission configuration corresponding to the first bitrate.

The configuration manager may be configured to determine the second bit rate by selecting a second transmission configuration from the plurality of predefined transmission configurations corresponding to a bitrate that is less than the first bitrate, the second transmission configuration corresponding to the second bitrate.

The device may further comprising an encoder configured to: encode media in accordance with a first codec so as to generate encoded data for transmitting the media stream at the second bitrate; and encode media in accordance with a second, different, codec so as to generate encoded data for transmitting the media stream at the first bitrate.

The transmission bitrate for transmitting the media stream may be increased from the second bitrate to the first bitrate at a first rate, the first rate being dependent on a difference in magnitude between the first bitrate and the second bitrate.

According to a second aspect there is provided a method of transmitting a media stream over a network, the method comprising: maintaining a measure of network quality indicative of available bandwidth over the network; using the measure of network quality to detect a reduction in network quality indicative of a reduced available bandwidth and, responsive to detecting said reduction, estimating a first bitrate corresponding to the reduced available bandwidth; responsive to estimating the first bitrate, determining a second bitrate lower than the first bitrate; transmitting the media stream at a transmission bitrate substantially equal to the second bitrate for a first period of time; and increasing the transmission bitrate from the second bitrate to the first bitrate over a second period of time.

The second bitrate may be determined in dependence on the measure of the reduced network quality.

The first and second bitrates may be determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

The step of estimating the first bitrate may comprise selecting a first transmission configuration from the plurality of predefined transmission configurations corresponding to the greatest bitrate that is less than the reduced available bandwidth, the first transmission configuration corresponding to the first bitrate.

The determining step may comprise selecting a second transmission configuration from the plurality of predefined transmission configurations corresponding to a bitrate that is less than the first bitrate, the second transmission configuration corresponding to the second bitrate.

The method may further comprise the steps of: encoding media in accordance with a first codec so as to generate encoded data for transmitting the media stream at the second bitrate; encoding media in accordance with a second, different, codec so as to generate encoded data for transmitting the media stream at the first bitrate.

The transmission bitrate for transmitting the media stream may be increased from the second bitrate to the first bitrate at a first rate, the first rate being dependent on a difference in magnitude between the first bitrate and the second bitrate.

According to a third aspect there is provided a device for controlling a transmission bitrate for a media stream, the device comprising: a quality estimator configured to determine a measure of network quality indicative of available bandwidth over the network; a configuration manager configured to detect an oscillation of the transmission bitrate between a first bitrate below the available bandwidth and a second bitrate above the available bandwidth; and a transceiver configured to, for a first oscillation period, transmit at the first bitrate for a first duration and transmit at the second bitrate for a second duration, the configuration manager being further configured to, for a second oscillation period subsequent to the first oscillation period, cause an increase in the first duration relative to the second duration such that the proportion of time transmitting at the first bitrate is greater for the second oscillation period than for the first oscillation period.

The first and second bitrates may be determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

The configuration manager may be configured to select a first transmission configuration from the plurality of predefined transmission configurations corresponding to the greatest bitrate that is less than the available bandwidth, the first transmission configuration corresponding to the first bitrate.

The second bitrate may correspond to a second transmission configuration from the plurality of predefined transmission configurations, the second transmission configuration corresponding to the lowest bitrate that is greater than the available bandwidth.

The oscillation period may be a time period for the transmission bitrate to change from the first bitrate to the second bitrate and back to the first bitrate.

The measure of network quality may be dependent on measuring a time between expecting to receive a packet of the media stream and receiving said expected packet.

The measure of network quality may be dependent on measuring a network delay time, the delay time comprising a time taken for a first packet to be received, at a first device, from a second device and a time taken for a second packet to be received, at the second device, from the first device.

The second packet may comprise an indication of a time when the first packet was generated.

The quality estimator may determine the measure of network quality by determining a measure of packet loss over the network, a measure of network jitter and/or a measure of burst loss.

The configuration manager may be configured to select one or more codecs in dependence on the measure of network quality, and the transceiver is configured to send information identifying said selected one or more codecs to another device so as to cause said another device to transmit, over the network, a media stream encoded in accordance with one of said selected one or more codecs.

The configuration manager may be configured to determine an amount of error correction data in dependence on the measure of network quality, the transmitted media stream comprising the determined error correction data.

The media stream may be a Voice over Internet Protocol stream.

According to a fourth aspect there is provided a method of controlling a transmission bitrate for a media stream, the method comprising the steps of: determining a measure of network quality indicative of available bandwidth over the network; detecting an oscillation of the transmission bitrate between a first bitrate below the available bandwidth and a second bitrate above the available bandwidth; for a first oscillation period, transmitting at the first bitrate for a first duration and transmitting at the second bitrate for a second duration; and for a second oscillation period subsequent to the first oscillation period, increasing the first duration relative to the second duration such that the proportion of time transmitting at the first bitrate is greater for the second oscillation period than for the first oscillation period.

The first and second bitrates may be determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

The method may further comprise the step of selecting a first transmission configuration from the plurality of predefined transmission configurations corresponding to the greatest bitrate that is less than the available bandwidth, the first transmission configuration corresponding to the first bitrate.

The second bitrate may correspond to a second transmission configuration from the plurality of predefined transmission configurations, the second transmission configuration corresponding to the lowest bitrate that is greater than the available bandwidth.

The oscillation period may be time period for the transmission bitrate to change from the first bitrate to the second bitrate and back to the first bitrate.

The measure of network quality may be dependent on measuring a time between expecting to receive a packet of the media stream and receiving said expected packet.

The measure of network quality may be dependent on measuring a network delay time, the delay time comprising a time taken for a first packet to be received, at a first device, from a second device and a time taken for a second packet to be received, at the second device, from the first device.

The second packet may comprise an indication of a time when the first packet was generated.

Determining said measure may comprise determining a measure of packet loss over the network, a measure of network jitter and/or a measure of burst loss.

The methods may further comprise the steps of: selecting one or more codecs in dependence on the measure of network quality; and sending information identifying said selected one or more codecs to another device so as to cause said another device to transmit, over the network, a media stream encoded in accordance with one of said selected one or more codecs.

The methods may further comprise the step of determining an amount of error correction data in dependence on the measure of network quality, the transmitted media stream comprising the determined error correction data.

The media stream may be a Voice over Internet Protocol stream.

There is provided non-transitory machine readable storage media having stored thereon processor executable instructions for implementing the methods described herein.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
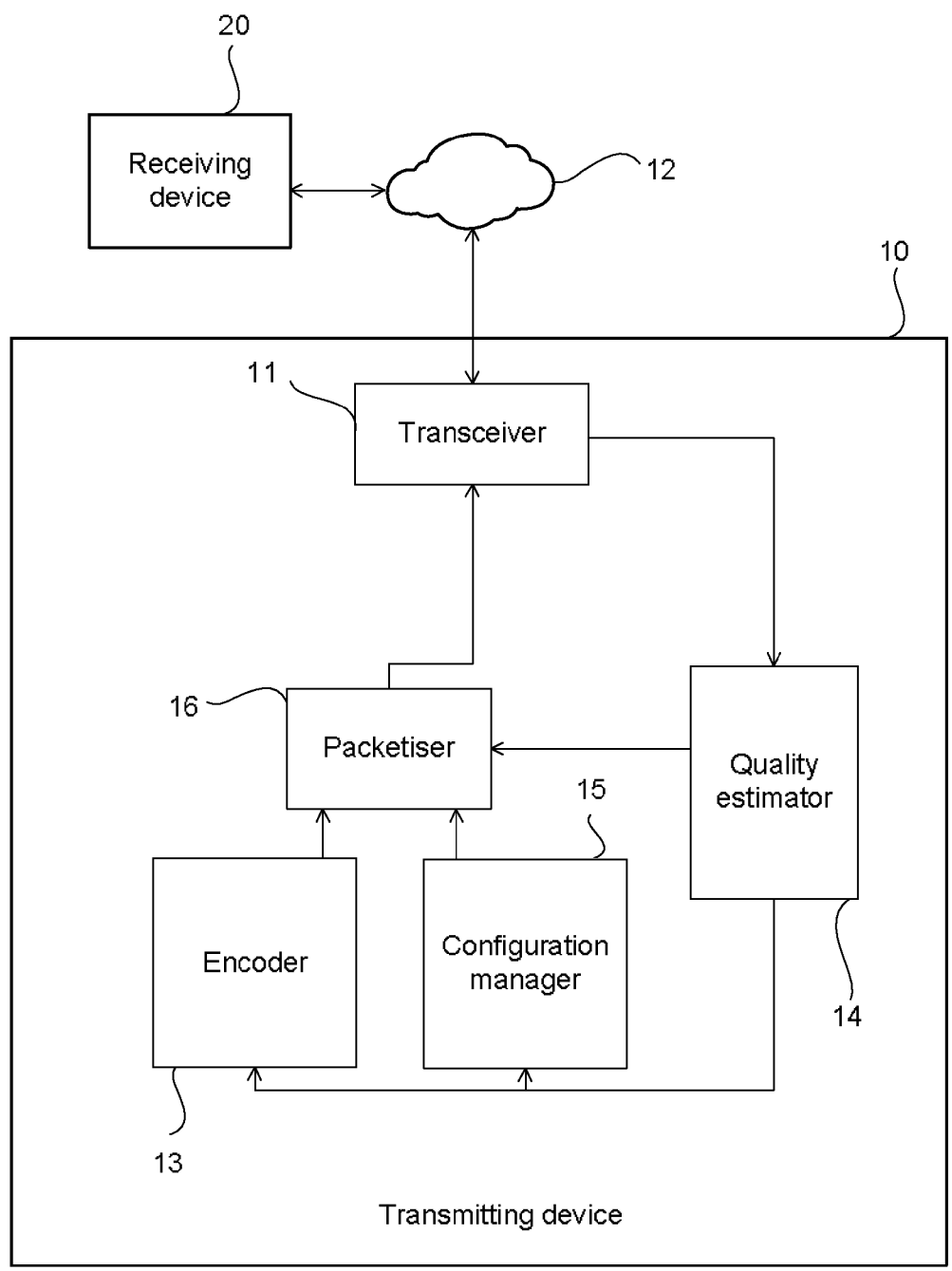
FIG. 1 shows a schematic diagram of a device capable of transmitting a media stream over a network.

FIG. 1 depicts a transmitting device 10, which may be any suitable device that is capable of generating packet based data such as a computer, smartphone, IP-phone, etc. The transmitting device 10 comprises a transceiver 11 for connection to a communications network 12 such as the internet or other packet based networks. The transmitting device 10 can transmit and/or receive data packets to and/or from the communications network 12 via the transceiver 11. The transmitting device 10 comprises an encoder 13 for encoding media that is to be transmitted over the communications network 12 to a receiving device 20.

The transmitting device 10 can comprise a quality estimator 14 that can estimate the quality of the network 12 and a configuration manager 15 that can determine parameters for transmitting media over the network 12. The configuration manager 15 can determine the transmission parameters in dependence on the estimate of the quality of the network 12. If there is a change in the condition or state of the network 12 (such as a change in the bandwidth availability), which is indicated by the quality estimate, the transmission parameters can be adapted by the configuration manager to provide an optimal stream for the new state of the network 12.

The configuration manager 15 may determine parameters such as parameters of the codec used for encoding and decoding media and the packet size for packets comprising the encoded media. The configuration manager 15 may determine and store a number of different configurations in a table during, for example, the session start-up. As shown in the example configuration table below, each configuration may have an associated packet size, codec and codec mode (if any).

Each codec (and mode) may have an encoding rate associated with it. Also, generally, the overhead associated with packetisation increases as the packet size decreases and so the transmission bitrate can be varied by varying the packet size. Thus, the transmission bitrate $BR_n$ for each configuration can be calculated. The configurations can be sorted in a decreasing bitrate order. More or fewer configurations than those shown in the configuration table below may be utilised.

TABLE 1 configuration table

| Configuration | Packet Size | Codec | Codec Mode (if any) | Bitrate |
| --- | --- | --- | --- | --- |
| $C_1$ | $PS_1$ | $Cd_1$ | $CM_1$ | $BR_{10}$ |
| $C_2$ | $PS_2$ | $Cd_1$ | $CM_1$ | $BR_9$ |
| $C_3$ | $PS_3$ | $Cd_1$ | $CM_1$ | $BR_8$ |
| $C_4$ | $PS_1$ | $Cd_2$ | $CM_1$ | $BR_7$ |
| $C_5$ | $PS_1$ | $Cd_2$ | $CM_2$ | $BR_6$ |
| $C_6$ | $PS_2$ | $Cd_2$ | $CM_2$ | $BR_5$ |
| $C_7$ | $PS_2$ | $Cd_3$ | None | $BR_4$ |
| $C_8$ | $PS_3$ | $Cd_4$ | None | $BR_3$ |
| $C_9$ | $PS_4$ | $Cd_3$ | None | $BR_2$ |
| $C_{10}$ | $PS_4$ | $Cd_4$ | None | $BR_1$ |

In the table, $C_n$ identifies a configuration, $PS_n$ is a packet size, $Cd_n$ is a codec, $CM_n$ is a codec mode and $BR_n$ is the transmission bitrate for that configuration. $BR_{10} > BR_9 > BR_8 > \ldots BR_1$ and $PS_4 > PS_3 > PS_2 > PS_1$. Each configuration has a different combination of codec (and codec modes, if available) and packet size, which leads to different transmission bitrates. Thus, when the available network bandwidth changes, an appropriate configuration can be selected so that the configuration with the maximum bitrate that is not greater than the available bandwidth can be utilised.

The quality estimator 14 can periodically determine the quality of the network, e.g. at a rate of once every 100 ms to give some suitable examples. When there is decrease in the quality of the network as indicated by the quality estimate (i.e. the transmission quality provided by the network) which leads to a decrease in the available bandwidth, the configuration manager determines the configuration, $C_n$, with the highest bitrate, $BR_n$, that is not greater than the available bandwidth (hereinafter referred to as the "optimal bitrate"). However, if there is a significant decrease in the available bandwidth, the configuration manager 15 does not immediately utilise the optimal bitrate. Instead, the configuration manager 15 determines a reduced bitrate that is lower than the optimal bitrate to utilise. Thus, when the significant decrease in available bandwidth is detected, the configuration manager 15 switches the transmission bitrate from a currently utilised bitrate to the reduced bitrate and not to the optimal bitrate. A significant decrease in the available bandwidth may, for example, be considered to be any decrease that would cause the configuration manager 15 to change the current bitrate to a bitrate that this lower than the next available lower bitrate. For example, if currently transmitting at $BR_{10}$, a decrease in the available bandwidth would be considered to be significant if the optimal bitrate is $BR_8$ or lower.

Packets which are transmitted from the transmitting device 10 may be queued at various points in the network path. For example, queuing may occur if the packets are transmitted at a higher bitrate than the bandwidth supported by the current network conditions. By switching to the reduced bitrate instead of the optimal bitrate, the transmitting device 10 can clear any queued up packets in the network path before switching to the optimal bandwidth. This helps reduce the delay in receiving the transmitted packets at the receiving device 20. The queuing up of packets may be caused by, for example, a delay between the change in the available bandwidth and detecting that change and so the transmitting device 10 may transmit packets at a bitrate that is above the available bandwidth during that delay. This can lead to a build-up of packets and queuing of packets at various points in the network path such as various network interfaces, access points, ENodeB, etc. By utilising the reduced bitrate, the build-up of packets can be cleared before switching to the optimal bitrate. This allows transmitted packets to arrive at the receiving device 20 in a timely manner, which is advantageous for real-time media streaming applications such as VoIP.

The amount of bitrate reduction from the optimal bitrate may be dependent on the amount of reduction in the available bandwidth. Generally, the amount of bitrate reduction may be proportional to the reduction in the available bandwidth. The amount of bitrate reduction can be made sufficient so as to allow clearance of the packet build up over a short period of time (e.g. over a time period in the range from 5 to 7 seconds and preferably 6 seconds). For example, if a stream was being transmitted using configuration $C_1$ (with bitrate $BR_{10}$) and a relatively small drop in the available bandwidth was detected for which the optimal bitrate is $BR_9$ (i.e. configuration $C_2$), the configuration manager 15 may switch to $C_4$ (which has a reduced bitrate of $BR_7$) for a period of time to clear any build-up of packets, before switching to $C_2$ to transmit at the optimal bitrate, $BR_9$. If a much larger drop in available bandwidth was detected (for example, >8 Kbps in certain VoIP applications), the bitrate may need to be reduced to a greater extent to clear a relatively larger build-up of packets. For example, if the optimal bitrate is now $BR_5$ (instead of $BR_9$), then the configuration manager 15 may switch to configuration $C_{10}$, which will reduce the bitrate to a greater extent to clear a relatively larger build-up of packets, before switching to $C_6$ (which may be done in quick adaptive steps) to transmit at the optimal bitrate, $BR_5$.

In some circumstances, a bitrate reduction from the optimal configuration may not be applied. For example, if there is a relatively small drop in the available bandwidth (e.g. if only the next lowest configuration is optimal), the configuration manager 15 may not apply the bitrate reduction and may immediately switch to the optimal bitrate. In another example, if the optimal bitrate following a drop in the available bandwidth corresponds to the lowest available configuration (e.g. $C_{10}$) then the configuration manager 15 may immediately switch to that configuration.

Alternatively or additionally, the amount of time transmitting at the reduced bitrate may be proportional to the amount of reduction in the available bandwidth. For example, if the large drop in the available bandwidth was detected, for which the optimal bitrate is $BR_5$, the configuration manager 15 may switch to $C_8$ instead of $C_{10}$, as described above, and transmit using $C_8$ for a longer period of time than if transmitting at $C_{10}$ before switching to $C_6$ to transmit at the optimal bitrate, $BR_5$. This will also clear the large build-up of packets and allow a higher quality configuration to be utilised, however at the expense of a larger delay.

After a suitable amount of time transmitting at the reduced bitrate, the configuration manager 15 may quickly change the transmission bitrate to the optimal bitrate. The rate at which the transmission bitrate is changed may be dependent on the amount that the bitrate is reduced from the optimal bitrate. Generally, the greater the amount that the bitrate has been reduced, the greater the rate at which the bitrate is increased from the reduced bitrate to the optimal bitrate. For example, if the reduced bitrate was $BR_7$ and the optimal bitrate was $BR_9$, the configuration manager 15 may switch from $C_4$ to $C_3$ to $C_2$ over t amount of time. Whereas if the reduced bitrate was $BR_1$ and the optimal bitrate was $BR_5$ the configuration manager may switch from $C_{10}$ to $C_8$ to $C_6$ over the same t period of time. Thus the rate at which the bitrate is increased is greater. The media stream is then transmitted at the optimal bitrate for the new network condition.

Figure 2:
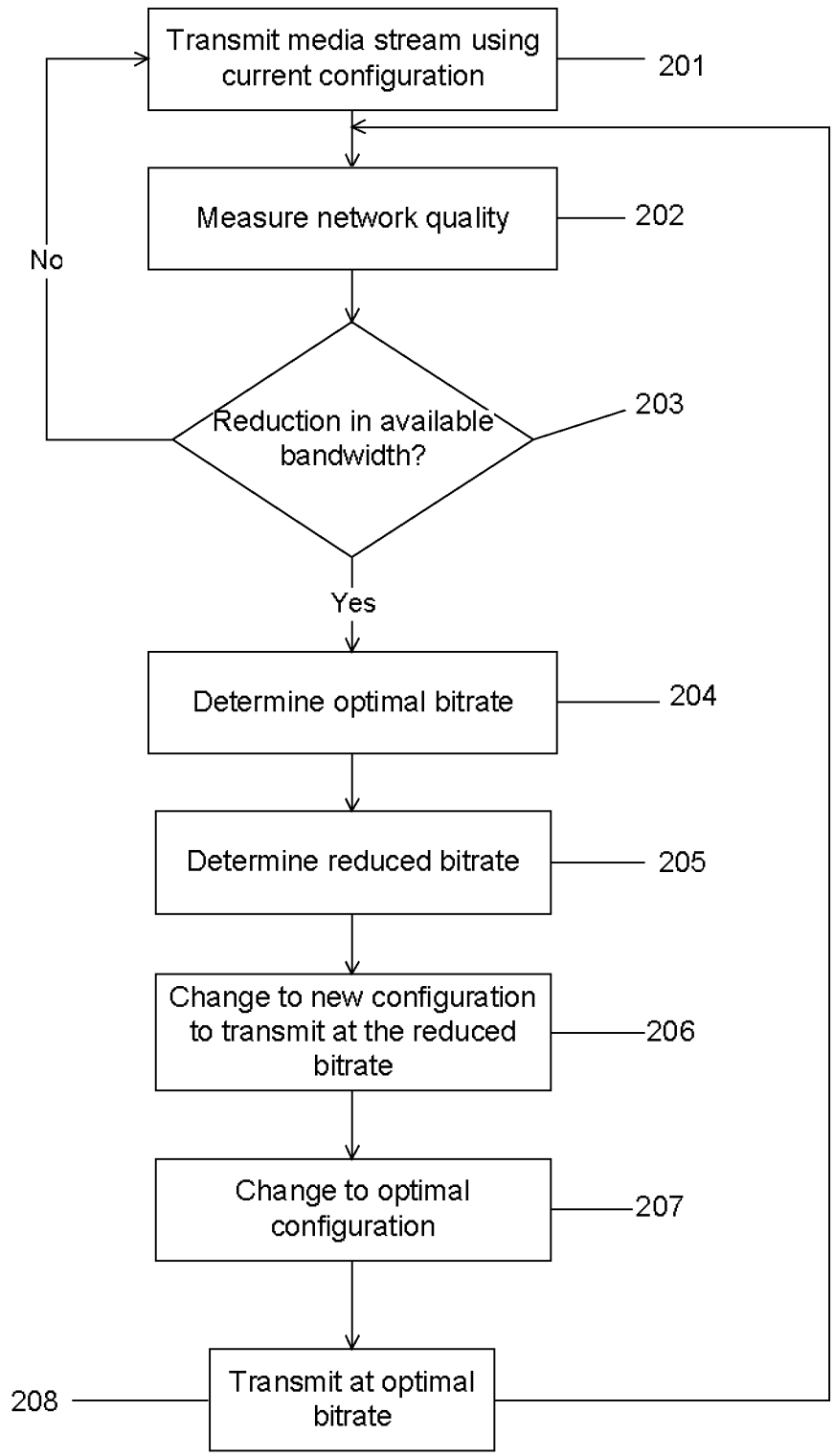
FIG. 2 shows a flowchart illustrating a process for transmitting media at an optimal bitrate.
Figure 2A:
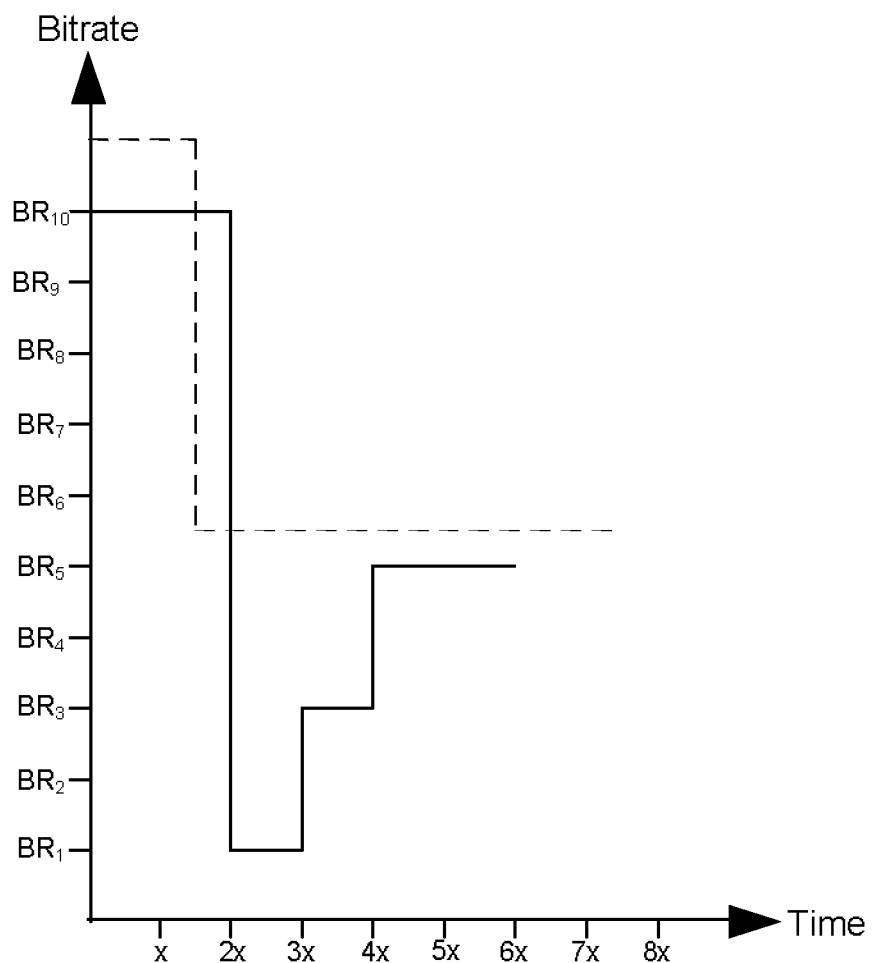
FIG. 2a shows a chart illustrating an example of the change in transmission bitrate over time when there is a change in the available bandwidth.

FIG. 2 is a flow diagram which describes an exemplary process (using the configuration table example above) for adapting the transmission bitrate of a media stream over a network with changeable conditions. FIG. 2a shows the change in the transmission bitrate (solid line) when there is a change in the available bandwidth (dashed line) for the example described in relation to FIG. 2. The x-axis represents time, where x is an amount of time. This amount of time may be a suitable amount of time based on how often the configuration manager 15 is to select a transmission configuration (which may be a new or the same configuration).

At step 201, the transmitting device 10 transmits a media stream over the network using configuration $C_1$. Thus media is encoded at the encoder 13 using codec $Cd_1$ (in mode $CM_1$) and the encoded media is packetised at a $PS_1$ packet size at the packetiser 16. The packets are transmitted over the network 12 at transmission bitrate $BR_{10}$, as shown in FIG. 2a.

At step 202, the quality estimator 14 determines the quality of the network 12 (i.e. the transmission quality provided by the network 12 to the transmitting device 10), which can indicate the available bandwidth over the network 12.

At step 203, if a significant reduction in the available bandwidth is detected, then the process moves on to step 204. If there is not a significant reduction in the available bandwidth (e.g. if there is no change or an increase in the available bandwidth), the process moves back to step 201 and maintains the current configuration or, if available and allowed by the available bandwidth, switches to a configuration with a higher bitrate.

At step 204, an optimal bitrate for the available bandwidth is determined. For example, if the available bandwidth corresponds to a bitrate between $BR_5$ and $BR_6$ (as shown by the dashed line from time=2x onwards in FIG. 2a) the configuration manager 15 will determine that $BR_5$ is the optimal bitrate as it is the highest selectable bitrate that is not greater than the available bandwidth.

At step 205, the configuration manager 15 determines a bitrate that is less than the optimal bitrate $BR_5$ to thereby select a reduced bitrate. Continuing with the above example, the reduced bitrate may be selected to be $BR_1$, as shown in FIG. 2a.

At step 206, the configuration manager 15 then changes the configuration from $C_1$ to $C_{10}$ and causes the encoder 13 to encode media using codec $Cd_4$ and the packetiser 16 to use packet size $PS_4$. The packets are then transmitted over the network 12 at transmission bitrate $BR_1$. As shown in FIG. 2a, the transmission bitrate is reduced from $BR_{10}$ to $BR_1$ at time=2x.

At step 207 after an appropriate amount of time, the configuration manager 15 switches the configuration of the transmitting device 10 from $C_{10}$ to $C_6$ (which corresponds to the optimum bitrate $BR_5$) by causing the encoder 13 to use codec $Cd_2$ (in mode $CM_2$) and the packetiser 16 to packetise the encoded media at a $PS_2$ packet size. As shown in FIG. 2a, the increasing of the transmission bitrate from $BR_1$ to $BR_5$ may be done in a step-wise manner by increasing from $BR_1$ to $BR_3$ (by switching the configuration from $C_{10}$ to $C_8$ by causing the encoder 13 to use codec $Cd_4$ and the packetiser 16 to packetise the encoded media at a $PS_3$ packet size) and then to $BR_5$. Increasing the transmission bitrate in a step-wise manner (rather than immediately switching to the optimal bitrate) provides a smooth transition in the voice quality as perceived by user at the receiving device 20.

At step 208, the media stream is transmitted at the optimal bitrate $BR_5$, as shown from time 4x onwards in FIG. 2a.

The process may periodically repeat itself with the measurement of quality estimate (e.g. every 100 ms) to continually adapt to changeable network conditions in real-time by returning to step 202.

When the available bandwidth is relatively stable, there may be some circumstances which can cause the transmission bitrate of the transmitting device 10 to oscillate between bitrates higher and lower than the available bandwidth.

This oscillation may be due to, for example, a finite number of transmission bitrates available to the transmitting device 10. For example, if the available bandwidth corresponds to a bitrate that is between $BR_5$ and $BR_6$ the configuration manager 15 will set the optimum bitrate to be $BR_5$. The quality estimator 14 may then indicate that there is slightly more bandwidth available in the network, which can cause the configuration manager 15 to increase the bitrate to $BR_6$, which is greater than the available bandwidth. The quality estimator 14 may then indicate to the configuration manager 15 that there is slightly less bandwidth available than $BR_6$ and so the configuration manager 15 decreases the bitrate back down to $BR_5$. This oscillation between $BR_5$ and $BR_6$ continues when the available bandwidth is between the two bitrates. Oscillation of the transmission bitrate may also occur due to tolerances in the bandwidth measurement, short term variations in the bandwidth, etc.

Figure 3:
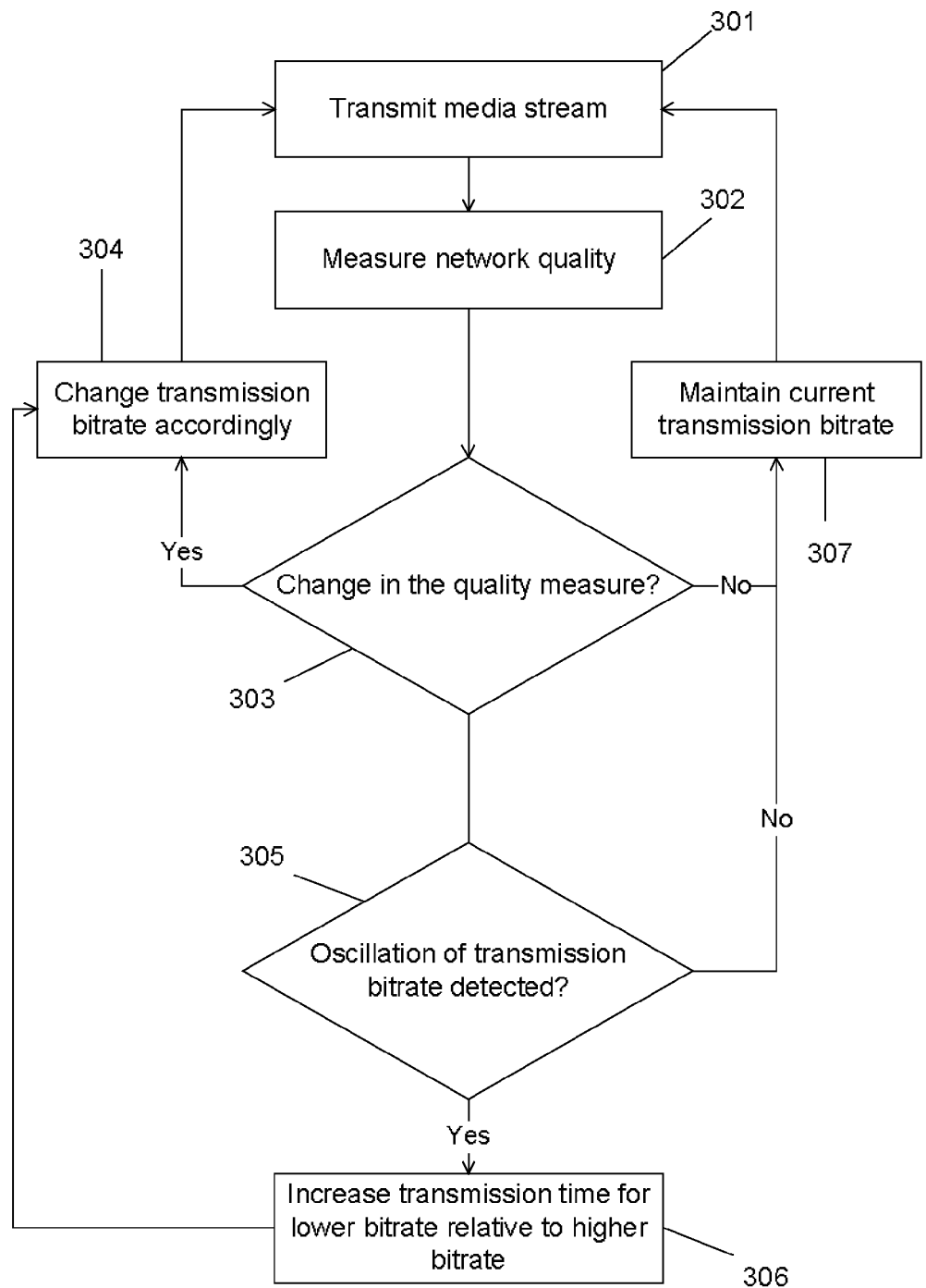
FIG. 3 shows a flowchart illustrating a process for controlling transmission bitrate oscillation.
Figure 3A:
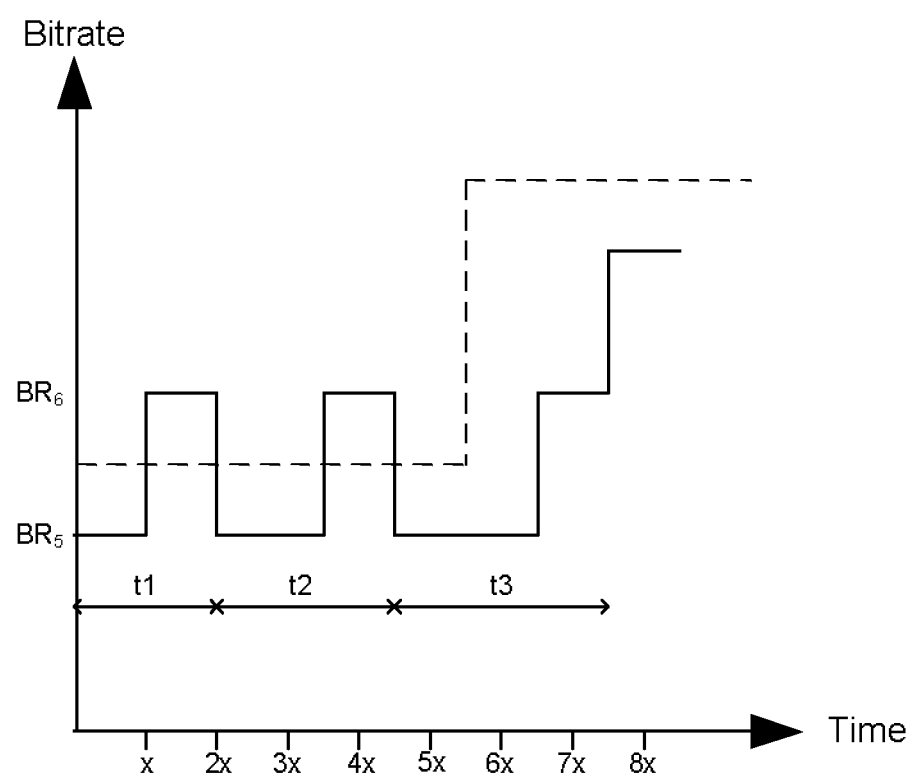
FIG. 3a shows a chart illustrating the oscillation control of a transmission bitrate.

FIG. 3 is a flow diagram which describes an exemplary process for controlling the oscillation of the transmission bitrate of a media stream. FIG. 3a shows the change in the transmission bitrate (solid line) over time and in relation to the available bandwidth (dashed line).

At step 301, the transmitting device 10 transmits a media stream over the network using, for example, configuration $C_6$.

At step 302, the quality estimator 14 determines the quality of the network 12 (i.e. the transmission quality provided by the network 12 to the transmitting device 10), which can indicate the available bandwidth over the network 12.

At step 303, if a change in the quality measure is detected, then the process moves on to step 304, where an appropriate configuration is selected in dependence on that change. For example, if there is an increase in the available bandwidth, a new configuration with a higher transmission bitrate than the previous configuration is selected. If there is a decrease in the available bandwidth, a new configuration with a lower transmission bitrate than the previous configuration is selected (for example, via steps 204 to 208 of FIG. 2). The media stream is then transmitted with the newly selected configuration at step 301.

If, at step 303, there is no change in the quality measure, the process moves to step 307, where current transmission bitrate is maintained. The media stream is then transmitted with the current transmission bitrate at step 301.

As mentioned above, when the available bandwidth corresponds to a bitrate that is between two possible transmission bitrates, the quality estimator may indicate that there is more or less bandwidth in the network. Due to the loop of steps 301 to 302 to 303 to 304 and back to 301, an oscillation in the transmission bitrate may occur even though there is no actual change in the network bandwidth. At step 305, the configuration manager 15 detects if the transmission bitrate is oscillating between two bitrates. An oscillation period is a time period in which the transmission bitrate changes from a first bitrate to a second bitrate and back to the first bitrate. A single oscillation period or a repetition of the change from the first bitrate to the second bitrate and back to the first bitrate over subsequent, adjacent oscillation periods can indicate that the transmission bitrate is oscillating. In the example shown in FIG. 3a, an oscillation may be detected by the configuration manager 15 when the bitrate changes from $BR_5$ to $BR_6$ and back to $BR_5$ during period time t1.

If, at step 305, the configuration manager 15 detects that an oscillation is occurring, the process moves on to step 306 where the configuration manager 15 can increase the duration at which the transmitting device 10 transmits at the lower of the two bitrates compared to the duration transmitting at the higher bitrate. For each period of oscillation, the configuration manager 15 can progressively increase the duration transmitting at the lower bitrate relative to the duration transmitting at the higher bitrate.

If, at step 305, there is no oscillation detected, the process moves back to step 301 via step 307, where the media stream is transmitted using the current configuration.

In the example shown in FIG. 3a, the transmission bitrate (solid line) oscillates above and below the available bandwidth (dashed line) at $BR_6$ and $BR_5$. For each period of oscillation, the configuration manager 15 increases the duration for transmitting at $BR_5$. For the first period t1, the duration for transmitting at $BR_5$ and $BR_6$ is x. The configuration manager 15 then detects that an oscillation is occurring at the end of t1. The configuration manager 15 then increases the duration for transmitting at $BR_5$ by an amount, e.g. to 1.5x, compared to x for transmitting at $BR_6$ for the second period t2. Thus, in this example, t2=1.25t1. Instead of increasing the periods tn, if periods t1, t2, etc were to be kept to the same duration, i.e. t2=t1, then for period t2 the configuration manager 15 can increase the duration transmitting at $BR_5$ (e.g. to x+y) and correspondingly decrease the duration transmitting at $BR_6$ (e.g. to x−y), where y is some duration, with y<x. In either method, the configuration manager 15 increases the lower $BR_5$ transmission duration for the next period t2 relative to previous period t1.

As shown in FIG. 3a, the transmission duration at $BR_5$ is increased further during time period t3. During t3, the available bandwidth increases, which is detected by the quality estimator 14. At the end of time period t3, the configuration manager 15 resets the time period for switching of the bitrates to the initial, shorter value (e.g. to 2x) so that the transmitting device 10 can adapt to the new network conditions and transmit at higher bitrates. The transmission bitrate can be adapted in a step-wise manner (rather than immediately switching to a new higher bitrate that corresponds to the available bandwidth) to provide a smooth transition in the voice quality as perceived by user at the receiving device 20.

By adapting the duration spent transmitting at the lower bitrate, the transmitting device 10 can transmit packets within the available bandwidth and so there will be less packet loss and/or build up in the network. By allowing the device to periodically increase its transmission bitrate the oscillation rate is decreased. By not completely avoiding oscillation in this manner the device can also adapt to higher transmission bitrates when there is greater bandwidth available.

The quality manager 14 can periodically determine the quality of the network. The time between quality measures is determined such that, if transmitting at a higher bitrate than available bandwidth, the duration of the transmission is not long enough to significantly worsen the network path (by causing packet build up) but is long enough to reflect the actual condition of the network. The duration between measurements is preferably 100 ms.

The time between configuration switching may be dependent on the condition of the network. For example, if the quality estimate indicates that the network conditions are highly changeable, then immediate change in configuration can take place so that the network path to the receiving device 20 is not worsened further. If the quality estimate indicates that the network condition is stable, then the configuration can be maintained for an appropriate amount of time (e.g. 6 seconds) before switching to next higher bitrate configuration.

Figure 4:
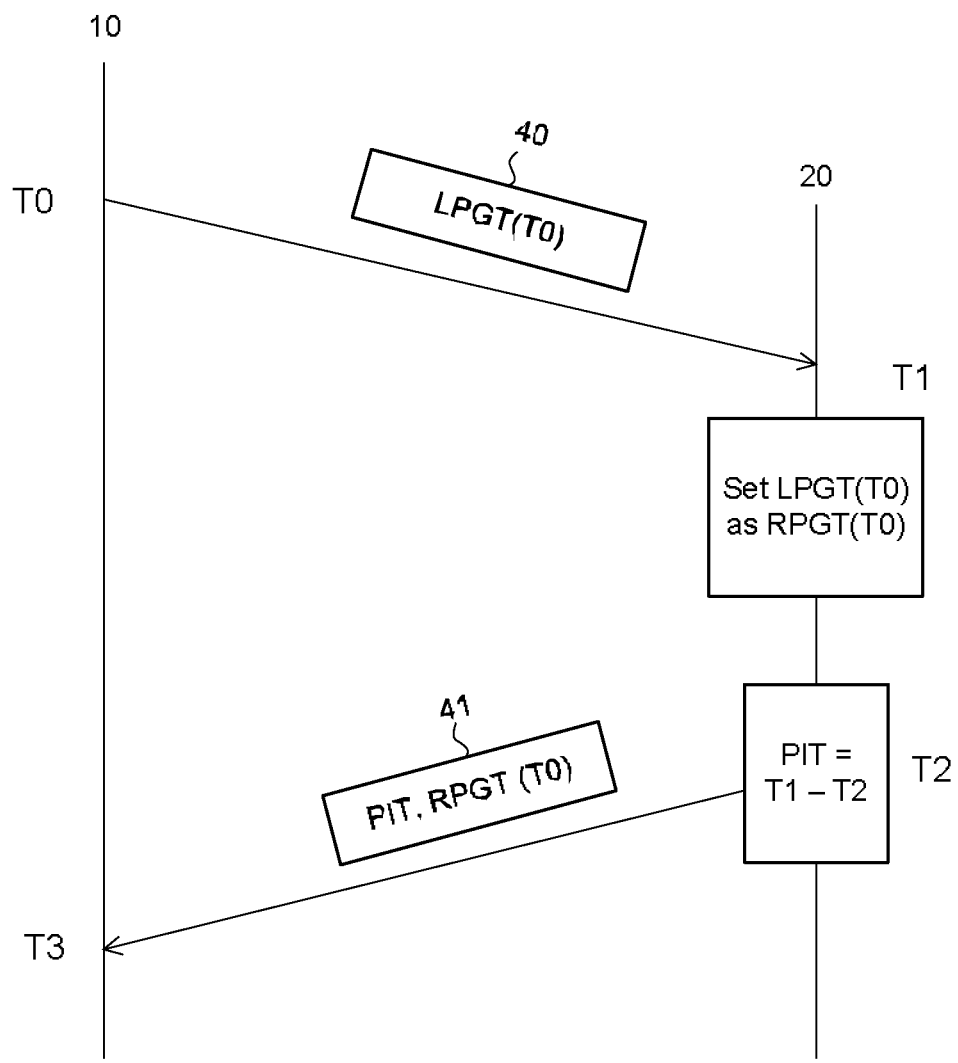
FIG. 4 depicts a process for estimating network delay.

The quality estimator 14 may directly test the available bandwidth by using dedicated testing methods that are known in the art. Alternatively or additionally, the quality estimator 14 may determine an indication of the available bandwidth by using certain parameters associated with packets that are already being used for communicating media between the transmitting and receiving devices 10 and 20. For example, an indication of the available bandwidth can be determined using one or a combination of the following measures:

1) Network delay. High network delay values can indicate that a larger number of packets are accumulated either in the device network driver or in the network. The network delay values indicate the time taken for a packet to travel from the transmitting device 10 to the receiving device 20 and back again. As shown in FIG. 4, packets 40 and 41, which may be packets for communicating the media stream and are transmitted by the transmitting and receiving devices 10 and 20, can each have the following information contained within it: Local Packet Generation Time (LPGT) and/or Remote Packet Generation Time (RPGT) and Packet Idle Time (PIT). When devices 10 and 20 are communicating, for example during a VoIP call, every packet transmitted for the call may incorporate the LPGT information, which for packet 40 is T0. When packet 40 is received at device 20, the time instant at reception (T1) is measured and when device 20 sends the next packet 41, the time elapsed between the time at reception of the last packet 40 and the time of transmission (T2) of the current packet 41 is incorporated into the packet 41 as the PIT. The packet generation time at device 10 (i.e. T0) of the last received packet 40 is included in packet 41. Device 10 can then estimate the network delay from the information in packet 41 as:

Network delay=packet 41 received time($T3$)−RPGT− PIT

The network delay value may be influenced by factors such as the number of network gateways in the network between devices 10 and 20. The influence of these gateways to the network delay may generally be constant. To account for the delay caused by the gateways, a number of network delay measurements may be taken (e.g. between 75 and 125 and preferably around 100) and then the average of a number of minimal delay values (e.g. the four minima values) can be determined. Half of the determined average value can be used to estimate the delay caused by the gateways. Thus, for subsequently measured network delay values, the halved average can be used as a fixed value to subtract from subsequent measured network delay values to account for the delay caused by the gateways.

2) Packet reception gap. The packet reception gap can indicate that continuous streams of packets are being lost or stuck in the network. This may lead to breaks in, for example, voice calls may be dropped if the packet reception gap value is high. To sustain a voice call whenever the packet reception gap is high, the transmission bitrate can be reduced so that packets can reach the receiving device 20 and the voice call can be maintained.

During a media stream, the receiving device 20 may expect to receive packets at certain times as part of the stream. For example, a packet may contain a portion of media that should be played back at the receiving device 20 in a certain order and/or at a certain time. The time elapsed between expecting to receive a packet and actually receiving that packet can indicate the packet reception gap. Alternatively, the packet reception gap can be indicated by counting the number of times a media player at the receiving device 20, which may require media packets at regular intervals, requests a packet for playing media before actually receiving a media packet.

3) Packet Loss. This measure indicates the percentage loss of packets in the network over a specified period.

4) Network jitter. This measure indicates the variation in the time between receiving consecutive packets. The variation may be caused by network congestion, timing drift, route changes, etc. A high value of network jitter indicates that more out of order packets are received.

5) Burst Loss. This measure indicates the number of packets in periods of time between the loss of a packet and the start a continuous reception of a predetermined number of good packets.

The measure of quality determined by quality estimator 14 may utilise one of or any combination of the above measures 1 to 5. When combining measures, each measure may be weighted differently to reflect their significance in effecting the quality of the network. For example, higher values of network delay and packet reception gap can more clearly indicate bad network conditions and so may be provided with a higher weighting. Thus appropriately weighting each measure when determining a combined measure can provide a quicker and more accurate reflection of bad network conditions and allow the configuration manager 15 to quickly adapt the transmission parameters of the media stream.

The values of each measure (or a combination of the measures) can provide an estimate of the quality or capacity of the network without providing an explicit bandwidth estimate. When the condition of the network changes, the change in value can provide an indication of whether the bandwidth has increased or decreased. In dependence on that change in value, a new configuration can be selected. For example, if the measure indicates that the bandwidth has increased (e.g. because determined values for each or any combination of measures 1)-5) above have decreased), then the configuration manager 15 can select a new configuration to use that transmits at a greater bitrate than the current configuration.

As measures 1)-5) are able to use properties of the current media stream to determine the quality estimate, the measures can provide an indication of the suitability of the currently utilised configuration for the current network condition. For example, if a measure made when transmitting at $BR_5$ indicates that there is capacity in the network, then the configuration manager 15 can increase the transmission bitrate to $BR_6$. When transmitting at $BR_6$, the measure may indicate that there is less or no capacity in the network and so the configuration manager may drop back to $BR_5$. Thus by using one or any combination of measures 1)-5) above, the suitability of a transmission bitrate for current network conditions can be determined.

The value of each measurement that is carried out may be quantized differently to reflect the significance of the measured value in effecting the quality of the network. For example, when providing a value for the network delay, if a short delay time is measured zero quantization may be applied to the value associated with that short delay time as the conditions of the network are considered to be good. However, if a long delay time is measured, which indicates that the conditions of the network have become poor, then a large quantization may be provided to the value associated to that long delay time to provide an exaggerated impression of the poor network condition, which can allow the system to react and adapt more quickly to the poor network condition.

The selection of the new configuration can be dependent on the measured value. For example, if the transmitting device 10 was transmitting using configuration $C_6$ and the measured value is relatively small this indicates that the network is good and there is some more bandwidth available, the configuration manager 15 may select configuration $C_5$ to transmit at a slightly higher bitrate. If the measured value was relatively large this indicates that the network conditions are not good and the configuration manager 15 may select configuration appropriately based on the value. The value of the next quality measure may then provide an indication of whether the available bandwidth is higher or lower than the new bitrate and the configuration manager can again select the configuration accordingly. Thus by periodically determining the quality of the network in this way, the transmission bitrate can be continuously adapted.

The configuration manager 15 may select an error correction scheme to be used when transmitting the media stream in dependence on the measured quality of the network. The configuration manager 15 may select error correction schemes such as a redundancy scheme (e.g. RFC 2198), forward error correction (FEC), overlap time stamp correction (OTR), etc. The selection of the appropriate scheme may be dependent on the amount of bandwidth required to implement each scheme. Generally, a redundancy scheme such as RFC 2198 requires less bandwidth than FEC, which requires less bandwidth than OTR. Thus, the configuration manager prioritises the use of a redundancy scheme, then FEC then OTR. If the redundancy scheme is not supported by either the transmitting or receiving devices 10 or 20, FEC is selected. If neither the redundancy scheme nor FEC are supported by either device 10 and 20, then OTR is selected.

When implementing an error correction scheme, the scheme can be configured in dependence on the measure of network quality. For example, the redundancy value (for FFC 2198) or the span (for FEC) can be configured based on the measure of network quality. When the measure indicates bad network conditions and more loss of packets, the redundancy values and FEC span can be increased in proportion to the loss in network quality so that there is a greater chance of packet recovery at the receiving device 20.

The receiving device 20 may comprise the same features and functionality as the transmitting device 10. The devices 10 and 20 can individually or together determine the quality measure. The devices 10 and 20 may also transmit the network quality estimate or network parameters to determine the configuration to be used for the media stream. The devices 10 and 20 may also individually or together negotiate to determine the codec and packet size to be used for the media stream.

Alternatively, the receiving device 20 may not comprise the same features and functionality as the transmitting device 10. For example, the receiving device 20 may not comprise a quality estimator 14 or may not be able to interpret a received network quality estimate. In the case of a VoIP stream between devices 10 and 20 for example, this may lead to the receiving device 20 not being able to adapt its transmission bitrate when the quality of the network changes. The transmitting device 10, however, does comprise a quality estimator 14 and can therefore estimate the quality of the network. Based on the quality estimate made by the transmitting device 10, the configuration manager can select one or more codecs that have transmission bitrates appropriate for the current estimated network quality. The transmitting device 10 can then send information indicating those selected codes to the receiving device 20 to cause the receiving device 20 to use one of those selected codecs. During initial call set up or renegotiation during the call, the transmitting and receiving devices 10 and 20 send each other a list of codecs supported by each respective device. The transmitting device 10 can cause the receiving device 20 to use one of the selected codecs from the list of supported codecs on the basis of network quality. The transmitting device 10 can therefore cause the receiving device 20 to adapt its transmission bitrate in dependence on a quality estimate made at the transmitting device 10.

In one example, the transmitting and receiving devices 10 and 20 may devices that are capable of VoIP communication. Example codecs that may be used for the VoIP communication include G722, G.711 (ALaw, μlaw), AMR WB (with variable modes and corresponding bitrates), G.729AB, G.726-16, G.726-24, G.726-32, G.726-40, G.723.1(5.3), AMR NB (with variable modes and corresponding bitrates).

The transmitting and receiving devices configured in accordance with the examples described herein could be embodied in hardware, software or any suitable combination of hardware and software. The transmitting and receiving devices of the examples described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In the examples described herein, the transmitting and receiving devices comprise one or more processors and one or more memories having program code stored thereon, the data processors and the memories being such as to, in combination, provide the claimed data processing systems and/or perform the claimed methods.

Data processing units described herein (e.g. encoder 13, quality estimator 14, configuration manager 15, packetiser 16) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. Each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A device for transmitting a media stream over a network, the device comprising:
   a quality estimator configured to estimate a measure of network quality indicative of available bandwidth over the network;
   a configuration manager configured to:
     use the measure of network quality to detect a reduction in available bandwidth and, responsive to detecting said reduction, determine a first bitrate corresponding to the reduced available bandwidth;
     in response to determining the first bitrate, determine a second bitrate lower than the first bitrate; and
   a transceiver configured to transmit the media stream at a transmission bitrate equal to the second bitrate for a first period of time, wherein the configuration manager is further configured to cause an increase of the transmission bitrate from the second bitrate to the first bitrate over a second period of time subsequent to said first period of time.

2. A device as claimed in claim 1, wherein the second bitrate is determined in relation to the measure of the reduced network quality.

3. A device as claimed in claim 1, the first and second bitrates being determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

4. A device as claimed in claim 3, wherein the configuration manager is configured to determine the first bitrate by selecting a first transmission configuration from the plurality of predefined transmission configurations corresponding to the greatest bitrate that is less than the reduced available bandwidth, the first transmission configuration corresponding to the first bitrate.

5. A device as claimed in claim 3, wherein the configuration manager is further configured to determine the second bit rate by selecting a second transmission configuration from the plurality of predefined transmission configurations corresponding to a bitrate that is less than the first bitrate, the second transmission configuration corresponding to the second bitrate.

6. A device as claimed in claim 1, further comprising an encoder configured to:
   encode media in accordance with a first codec so as to generate encoded data for transmitting the media stream at the second bitrate; and
   encode media in accordance with a second, different, codec so as to generate encoded data for transmitting the media stream at the first bitrate.

7. A device as claimed in claim 1, wherein the transmission bitrate for transmitting the media stream is increased from the second bitrate to the first bitrate at a first rate, the first rate being dependent on a difference in magnitude between the first bitrate and the second bitrate.

8. A device as claimed in claim 1, said measure of network quality being dependent on measuring a time between expecting to receive a packet of the media stream and receiving said expected packet.

9. A device as claimed in claim 1, said measure of network quality being dependent on measuring a network delay time, the delay time comprising a time taken for a first packet to be received, at a first device, from a second device and a time taken for a second packet to be received, at the second device, from the first device.

10. A device as claimed in claim 9, the second packet comprising an indication of a time when the first packet was generated.

11. A device as claimed in claim 1, wherein the quality estimator estimates the measure of network quality by determining a measure of packet loss over the network, a measure of network jitter and/or a measure of burst loss.

12. A device as claimed in claim 1, wherein the configuration manager is further configured to select one or more codecs in relation to the measure of network quality, and the transceiver is configured to send information identifying said selected one or more codecs to another device so as to cause said another device to transmit, over the network, a media stream encoded in accordance with one of said selected one or more codecs.

13. A device as claimed in claim 1, wherein the configuration manager is further configured to determine an amount of error correction data in relation to the measure of network quality, the transmitted media stream comprising the determined error correction data.

14. A method of transmitting a media stream over a network, the method comprising:
   estimating a measure of network quality indicative of available bandwidth over the network;
   using the measure of network quality to detect a reduction in available bandwidth and, responsive to detecting said reduction, determining a first bitrate corresponding to the reduced available bandwidth;
   responsive to determining the first bitrate, determining a second bitrate lower than the first bitrate;
   transmitting the media stream at a transmission bitrate equal to the second bitrate for a first period of time; and increasing the transmission bitrate from the second bitrate to the first bitrate over a second period of time subsequent to said first period of time.

15. A non-transitory machine readable storage medium having stored thereon processor executable instructions, which when executed cause at least one processor to transmit a media stream over a network by performing the method as claimed in claim 14.

16. A device for controlling a transmission bitrate for a media stream, the device comprising:
  a quality estimator configured to estimate a measure of network quality indicative of available bandwidth over the network;
  a configuration manager configured to detect an oscillation of the transmission bitrate between a first bitrate below the available bandwidth and a second bitrate above the available bandwidth; and
  a transceiver configured to, for a first oscillation period, transmit at the first bitrate for a first duration and transmit at the second bitrate for a second duration;
  the configuration manager being further configured to, for a second oscillation period subsequent to the first oscillation period, cause an increase in the first duration relative to the second duration whereby the proportion of time transmitting at the first bitrate is greater for the second oscillation period than for the first oscillation period.

17. A device as claimed in claim 16, the first and second bitrates being determined from a plurality of predefined transmission configurations, each transmission configuration being associated with a codec for encoding media for the media stream and with a packet size for transmitting packets comprising the media stream, each transmission configuration corresponding to a bitrate that is different to the bitrates corresponding to the other transmission configurations.

18. A device as claimed in claim 16, wherein the configuration manager is configured to select a first transmission configuration from the plurality of predefined transmission configurations corresponding to the greatest bitrate that is less than the available bandwidth, the first transmission configuration corresponding to the first bitrate.

19. A device as claimed in claim 16, wherein the second bitrate corresponds to a second transmission configuration from the plurality of predefined transmission configurations, the second transmission configuration corresponding to the lowest bitrate that is greater than the available bandwidth.

20. A device as claimed in claim 16, said oscillation period being a time period for the transmission bitrate to change from the first bitrate to the second bitrate and back to the first bitrate.

21. A method of controlling a transmission bitrate for a media stream, the method comprising:
  estimating a measure of network quality indicative of available bandwidth over the network;
  detecting an oscillation of the transmission bitrate between a first bitrate below the available bandwidth and a second bitrate above the available bandwidth;
  for a first oscillation period, transmitting at the first bitrate for a first duration and transmitting at the second bitrate for a second duration; and
  for a second oscillation period subsequent to the first oscillation period, increasing the first duration relative to the second duration whereby the proportion of time transmitting at the first bitrate is greater for the second oscillation period than for the first oscillation period.

22. A non-transitory machine readable storage medium having stored thereon processor executable instructions, which when executed cause at least one processor to control a transmission bitrate for a media stream by performing the method as claimed in claim 21.

* * * * *